(12) United States Patent
Wang et al.

(10) Patent No.: US 7,757,478 B2
(45) Date of Patent: Jul. 20, 2010

(54) SYSTEM AND METHOD FOR MONITORING OPERATION OF AN EXHAUST GAS TREATMENT SYSTEM

(75) Inventors: Da Yu Wang, Troy, MI (US); David D. Cabush, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1072 days.

(21) Appl. No.: 11/451,939

(22) Filed: Jun. 13, 2006

(65) Prior Publication Data

US 2007/0079597 A1 Apr. 12, 2007

Related U.S. Application Data

(60) Provisional application No. 60/734,087, filed on Nov. 7, 2005, provisional application No. 60/725,054, filed on Oct. 7, 2005, provisional application No. 60/725,055, filed on Oct. 7, 2005.

(51) Int. Cl.
*F01N 3/00* (2006.01)
(52) U.S. Cl. .............................. 60/286; 60/285; 60/289; 60/295; 60/301
(58) Field of Classification Search ................... 60/277, 60/285, 286, 295
See application file for complete search history.

(56) References Cited

U.S. PATENT DOCUMENTS 5,145,566 A 9/1992 Logothetis et al. ..... 204/153.18

(Continued)

FOREIGN PATENT DOCUMENTS

DE 10056320 6/2002

(Continued)

OTHER PUBLICATIONS

EP Search Report dated Feb. 4, 2009.

(Continued)

*Primary Examiner*—Thomas E Denion
*Assistant Examiner*—Jesse Bogue
(74) *Attorney, Agent, or Firm*—Thomas N. Twomey (57) ABSTRACT

A system and a method for monitoring operation of an exhaust gas treatment system using an exhaust gas sensor in accordance with an exemplary embodiment is provided. The exhaust gas treatment system has an exhaust pipe configured to receive exhaust gases. The exhaust gas treatment system has an SCR catalyst coupled to the exhaust pipe. The exhaust gas treatment system has a urea delivery system configured to delivery urea upstream of the SCR catalyst. The exhaust gas sensor has an ammonia sensing electrode communicating with exhaust gases downstream of the SCR catalyst. The method includes generating a first output signal utilizing the ammonia sensing electrode, the first output signal being indicative of a first ammonia level. The method further includes generating a second output signal to induce the urea delivery system to deliver a predetermined flow rate of urea upstream of the SCR catalyst. The second output signal is based on the first output signal. The method further includes calculating a first ammonia level range utilizing at least a first engine operating parameter. Finally, the method includes generating a third output signal when the first ammonia level is outside the first ammonia level range. The third output signal indicates at least one of the urea delivery system having degraded operational performance, the SCR catalyst having degraded operational performance, and the exhaust gas sensor having degraded operational performance.

16 Claims, 9 Drawing Sheets

U.S. PATENT DOCUMENTS

2003/0089101 A1* 5/2003 Tanaka et al. ............... 60/285
2004/0098974 A1  5/2004 Nieuwstadt et al.
2004/0118703 A1  6/2004 Wang et al.
2004/0132202 A1* 7/2004 Nishiyama et al. .......... 436/113

FOREIGN PATENT DOCUMENTS

| EP | 1069288 | 1/2001 |
| EP | 1426575 | 6/2004 |
| EP | 1426575 A1 * | 6/2004 |
| WO | 03100225 | 12/2003 |

OTHER PUBLICATIONS

Pending U.S. Appl. No. 60/725,054, filed Oct. 7, 2005 entitled: Multicell Ammonia Sensor.

Pending U.S. Appl. No. 60/725,055, filed Oct. 7, 2005 entitled: NOx Sensor and Methods of Using the Same.

* cited by examiner

SYSTEM AND METHOD FOR MONITORING OPERATION OF AN EXHAUST GAS TREATMENT SYSTEM

CROSS REFERENCE TO RELATED APPLICATIONS

The application claims the benefit of U.S. Provisional application Ser. No. 60/734,087, filed Nov. 7, 2005, the contents of which are incorporated herein by reference thereto. The application is also related to U.S. Provisional application Ser. No. 60/725,054, filed Oct. 7, 2005 and U.S. Provisional application Ser. No. 60/725,055, filed Oct. 7, 2005, the contents of which are incorporated herein by reference thereto.

TECHNICAL FIELD

A system and a method for monitoring operation of an exhaust gas treatment system using an exhaust gas sensor are provided.

BACKGROUND

Vehicle engines emit nitrogen oxides (NOx), including $NO_2$, NO, and $N_2O$. Generally, diesel engines emit higher levels of NOx than gasoline engines, because generally, diesel engines operate at higher combustion temperatures and with a higher air/fuel intake ratio. Government emission regulations mandate that diesel vehicles meet NOx emission level output requirements. However, reducing the combustion temperatures and reducing the air/fuel intake ratio can reduce the diesel engine's efficiency and can increase the amount of hydrocarbons, carbon monoxide, and soot in the exhaust gas.

To meet emissions regulations, diesel vehicles can incorporate an exhaust treatment system that reduces NOx. In the application, the exhaust treatment system is equipped to use a urea delivery system and a selective catalytic reduction (SCR) catalyst to reduce NOx emissions. However, the SCR catalyst can have degraded operational performance when the SCR catalyst approaches an end of its operational life.

Therefore, there is a need for a system for monitoring operation of an exhaust gas treatment system using an SCR catalyst to detect degraded operational performance of the exhaust gas treatment system.

SUMMARY

A method for monitoring operation of an exhaust gas treatment system using an exhaust gas sensor in accordance with an exemplary embodiment is provided. The exhaust gas treatment system has an exhaust pipe configured to receive exhaust gases. The exhaust gas treatment system has an SCR catalyst coupled to the exhaust pipe. The exhaust gas treatment system has a urea delivery system configured to delivery urea upstream of the SCR catalyst. The exhaust gas sensor has an ammonia sensing electrode communicating with exhaust gases downstream of the SCR catalyst. The method includes generating a first output signal utilizing the ammonia sensing electrode, the first output signal being indicative of a first ammonia level. The method further includes generating a second output signal to induce the urea delivery system to deliver a predetermined flow rate of urea upstream of the SCR catalyst. The second output signal is based on the first output signal. The method further includes calculating a first ammonia level range utilizing at least a first engine operating parameter. Finally, the method includes generating a third output signal when the first ammonia level is outside the first ammonia level range. The third output signal indicates at least one of the urea delivery system having degraded operational performance, the SCR catalyst having degraded operational performance, and the exhaust gas sensor having degraded operational performance.

A method for monitoring operation of an exhaust gas treatment system using an exhaust gas sensor in accordance with another exemplary embodiment is provided. The exhaust gas treatment system has an exhaust pipe configured to receive exhaust gases. The exhaust gas treatment system has an SCR catalyst coupled to the exhaust pipe. The exhaust gas treatment system has a urea delivery system configured to delivery urea upstream of the SCR catalyst. The exhaust gas sensor has an ammonia sensing electrode communicating with exhaust gases downstream of the SCR catalyst. The method includes generating a first output signal utilizing the ammonia sensing electrode. The first output signal is indicative of a first ammonia level. The method further includes generating a second output signal utilizing at least a first engine operating parameter to induce the urea delivery system to deliver a predetermined flow rate of urea upstream of the SCR catalyst. The method further includes calculating a first ammonia level range utilizing at least a second engine operating parameter. The method further includes generating a third output signal when the first ammonia level is outside the first ammonia level range. The third output signal indicates at least one of the urea delivery system having degraded operational performance, the SCR catalyst having degraded operational performance, and the exhaust gas sensor having degraded operational performance.

A method for monitoring operation of an exhaust gas sensor communicating with exhaust gases in accordance with another exemplary embodiment is disclosed. The exhaust gas sensor has a temperature sensor disposed in thermal communication with a heater. The method includes generating a first output signal utilizing the temperature sensor. The method further includes generating a second output signal to induce the heater to generate heat based on the first output signal. The method further includes calculating an electrical power level supplied to the heater by the second output voltage signal over a predetermined time period. The method further includes calculating an electrical power level range to control a temperature of the exhaust gas sensor utilizing an engine operating parameter. The method further includes generating a third output signal when the electrical power level is outside the electrical power level range, the third output signal being indicative of the exhaust gas sensor having degraded operational performance.

A system for monitoring operation of an exhaust gas treatment system in accordance with another exemplary embodiment is disclosed. The exhaust gas treatment system has an exhaust pipe configured to receive exhaust gases, an SCR catalyst coupled to the exhaust pipe, and a urea delivery system configured to deliver urea upstream of the SCR catalyst. The system includes an exhaust gas sensor configured to generate a first output signal. The first output signal is indicative of an ammonia level downstream of the SCR catalyst. The system further includes a controller operably communicating with the exhaust gas sensor. The controller is configured to receive the first output signal. The controller is further configured to generate a second output signal to induce the urea delivery system to deliver a predetermined flow rate of urea upstream of the SCR catalyst. The second output signal is based on the first output signal. The controller is further configured to calculate a first ammonia level range utilizing at least a first engine operating parameter. The controller is further configured to generate a third output signal when the first ammonia level is outside the first ammonia level range. The third output signal indicates at least one of the urea delivery system having degraded operational performance, the SCR catalyst having degraded operational performance, and the exhaust gas sensor having degraded operational performance.

A system for monitoring operation of an exhaust gas treatment system in accordance with another exemplary embodiment is disclosed. The exhaust gas treatment system has an exhaust pipe receiving exhaust gases, an SCR catalyst coupled to the exhaust pipe, and a urea delivery system configured to deliver urea upstream of the SCR catalyst. The system includes an exhaust gas sensor configured to generate a first output signal. The first output signal is indicative of an ammonia level downstream the SCR catalyst. The system further includes a controller operably communicating with the exhaust gas sensor. The controller is configured to receive the first output signal. The controller is further configured to generate a second output signal utilizing at least one first engine operating parameter to induce the urea delivery system to deliver a predetermined flow rate of urea upstream of the SCR catalyst. The controller is further configured to calculate a first ammonia level range utilizing at least one first engine operating parameter. The controller is further configured to generate a third output signal when the first ammonia level is outside the first ammonia level range. The third output signal indicates at least one of the urea delivery system having degraded operational performance, the SCR catalyst having degraded operational performance, and the exhaust gas sensor having degraded operational performance.

A system for monitoring an exhaust gas sensor in accordance with another exemplary embodiment is disclosed. The exhaust gas sensor has a heater. The system includes a temperature sensor disposed in thermal communication with the exhaust gas sensor. The temperature sensor is configured to generate a first signal indicative of a temperature of the exhaust gas sensor. The system further includes a controller operably communicating with the temperature sensor. The controller is configured to receive the first output signal. The controller is further configured to generate a second signal to induce the heater to generate heat based on the first output signal. The controller is further configured to calculate an electrical power level supplied to the heater by the second signal over a predetermined time period. The controller is further configured to calculate an electrical power level range to control exhaust gas sensor temperature utilizing an engine operating parameter. The controller is further configured to generate a third output signal when the electrical power level is outside the electrical power level range, the third output signal indicating the exhaust gas sensor having degraded operational performance.

BRIEF DESCRIPTION OF THE DRAWINGS

Referring now to the figures, which are exemplary embodiments, and wherein like elements are numbered alike.

DETAILED DESCRIPTION OF EXEMPLARY EMBODIMENTS

Figure 1:
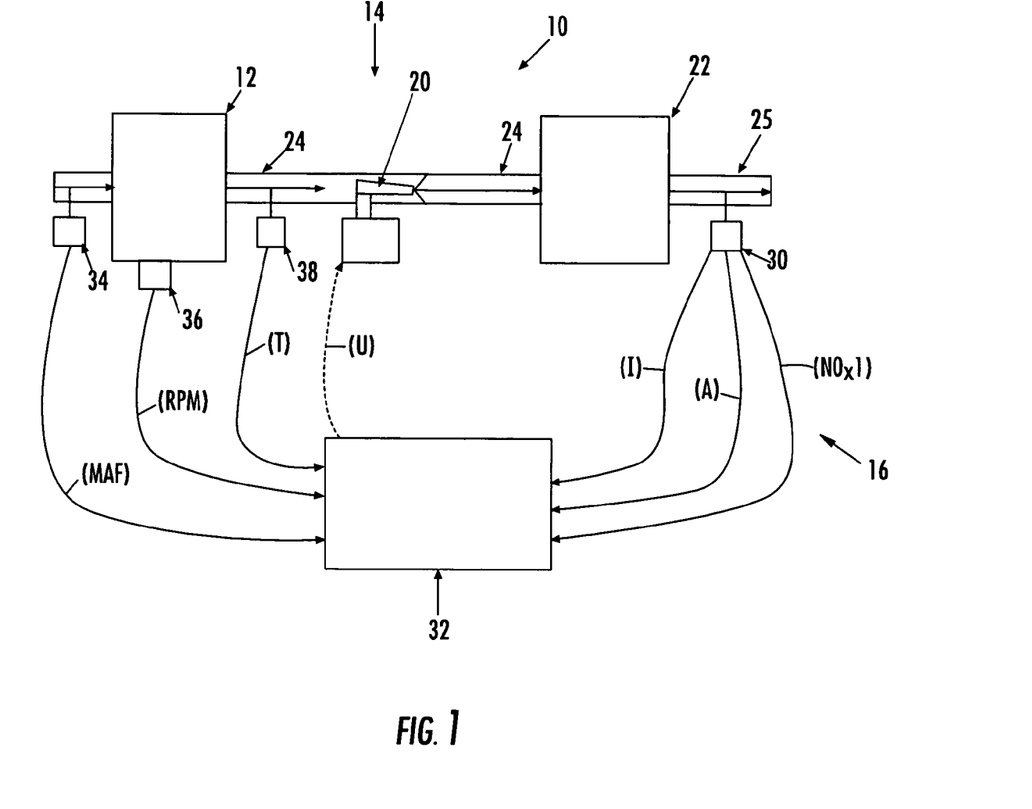
FIG. 1 is a block diagram of a vehicle having an engine, an exhaust treatment system, and a monitoring system in accordance with an exemplary embodiment of the invention.

Referring to FIG. 1, a vehicle 10 includes an engine 12, an exhaust gas treatment system 14, and a control and monitoring system 16. In an exemplary embodiment, the engine 12 is a diesel engine. In an alternative embodiment, the engine 12 is a gasoline engine. The engine 12 produces exhaust gases, which are received by the exhaust gas treatment system 14.

The exhaust gas treatment system 14 is provided to reduce NOx emissions in exhaust gases received from the engine 12. The exhaust gas treatment system 14 includes a urea delivery system 20 and exhaust pipe portions 24, 25. The exhaust pipe portion 24 is operably coupled between the engine 12 and an inlet of the SCR catalyst 22. The exhaust pipe portion 25 is operably coupled to an outlet of the SCR catalyst 22. Exhaust gases from the engine flow through the exhaust pipe portion 24, the SCR catalyst 22, and the exhaust pipe portion 25. The urea delivery system 20 is operably coupled to the exhaust pipe portion 24 to deliver urea upstream of the SCR catalyst 22.

The urea delivery system 20 is provided to deliver a predetermined flow rate of urea (or other NOx reducing agent, such as, ammonia) to exhaust gases in response to a signal (U) from a controller 32. Further, the urea delivery system 20 can store and maintain urea at selected conditions, (for example, at a selected temperature and pressure to maintain NOx reducing properties). Further, the urea delivery system 20 can receive a predetermined amount of air, and can maintain both the air and urea at predetermined pressures. The pressurized urea and air can be mixed at a predetermined ratio and can be delivered into the exhaust gases by being atomized through an injector. Iteratively, opening and closing a solenoid valve (not shown) in the urea delivery system 20 in response to the signal (U) from the controller 32 can control the flow rate of the urea into the exhaust pipe portion 24. Specifically, the controller 32 controls a duty cycle (a fraction of time that the solenoid valve will remain in the open position) of the signal (U) corresponding to a selected urea delivery rate.

The SCR catalyst 22 is constructed from a substrate, catalytic metal(s), support materials, and ammonia ($NH_3$) trapping material(s). The SCR catalyst 22 promotes the catalytic oxidation of $NO_x$ using a catalytic metal effective for such oxidation. The ammonia produced from urea reacting with the exhaust gases can collect on the ammonia trapping materials of the SCR catalyst 22. The $NO_x$ can react (as a strong acid e.g., $NO_x$ and $HNO_3$) with the ammonia (as a strong base e.g., $NH_3$ and $NH_4OH$) on the SCR catalyst surface, forming nitrogen and water.

Examples of this reaction are as follows:

$$2NO + 2NH_3 + \frac{1}{2}O_2 \rightarrow 2N_2 + 3H_2O \qquad (1)$$

$$NO + NO_2 + 2NH_3 \rightarrow 2N_2 + 3H_2O \qquad (2)$$

The control and monitoring system 16 is provided to control operation of the engine 12 and the urea delivery system 20, to reduce NOx emissions. The system 16 is further provided to monitor operation of the exhaust gas treatment system 14 and to determine when the SCR catalyst 22 has degraded operational performance. The system 16 includes an exhaust gas sensor 30, a mass air flow sensor 34, an RPM sensor 36, a temperature sensor 38, and the controller 32.

Figure 2:
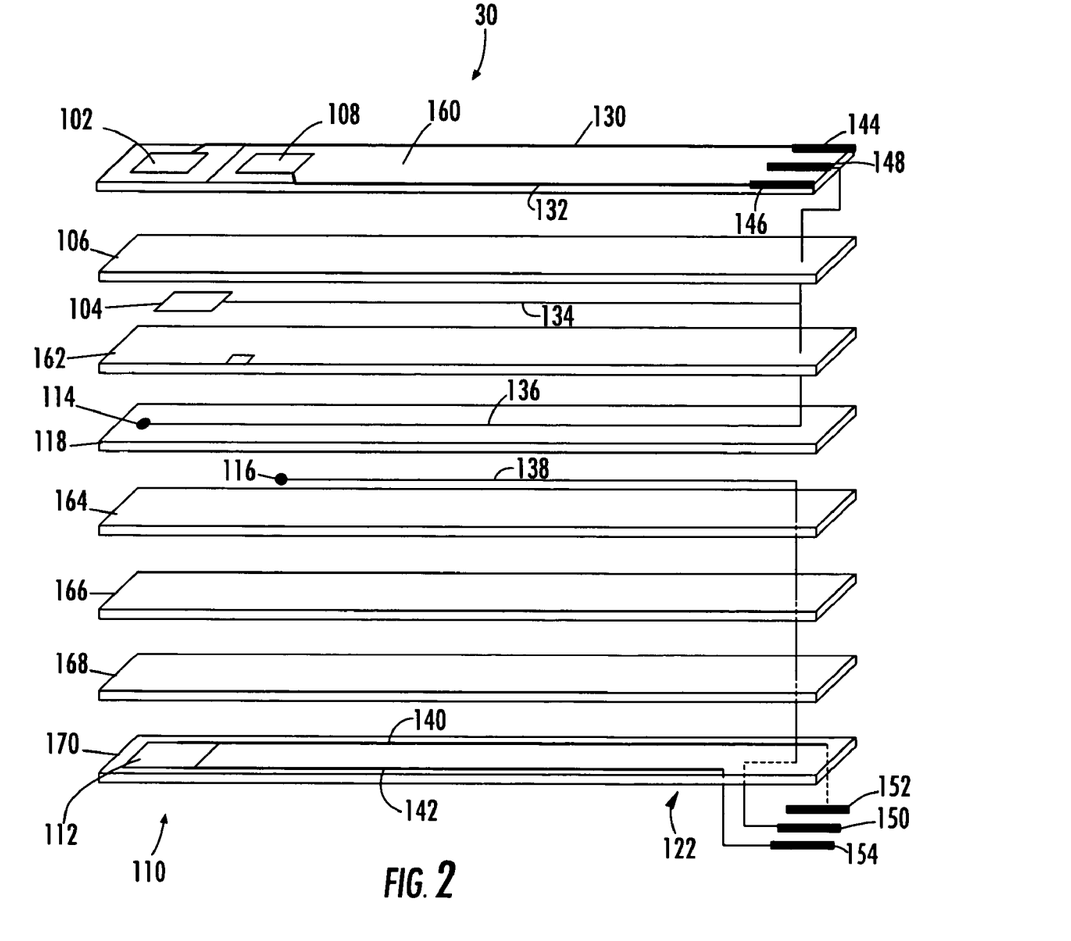
FIG. 2 is an exploded view of an exhaust gas sensor utilized in the monitoring system of FIG. 1.
Figure 3:
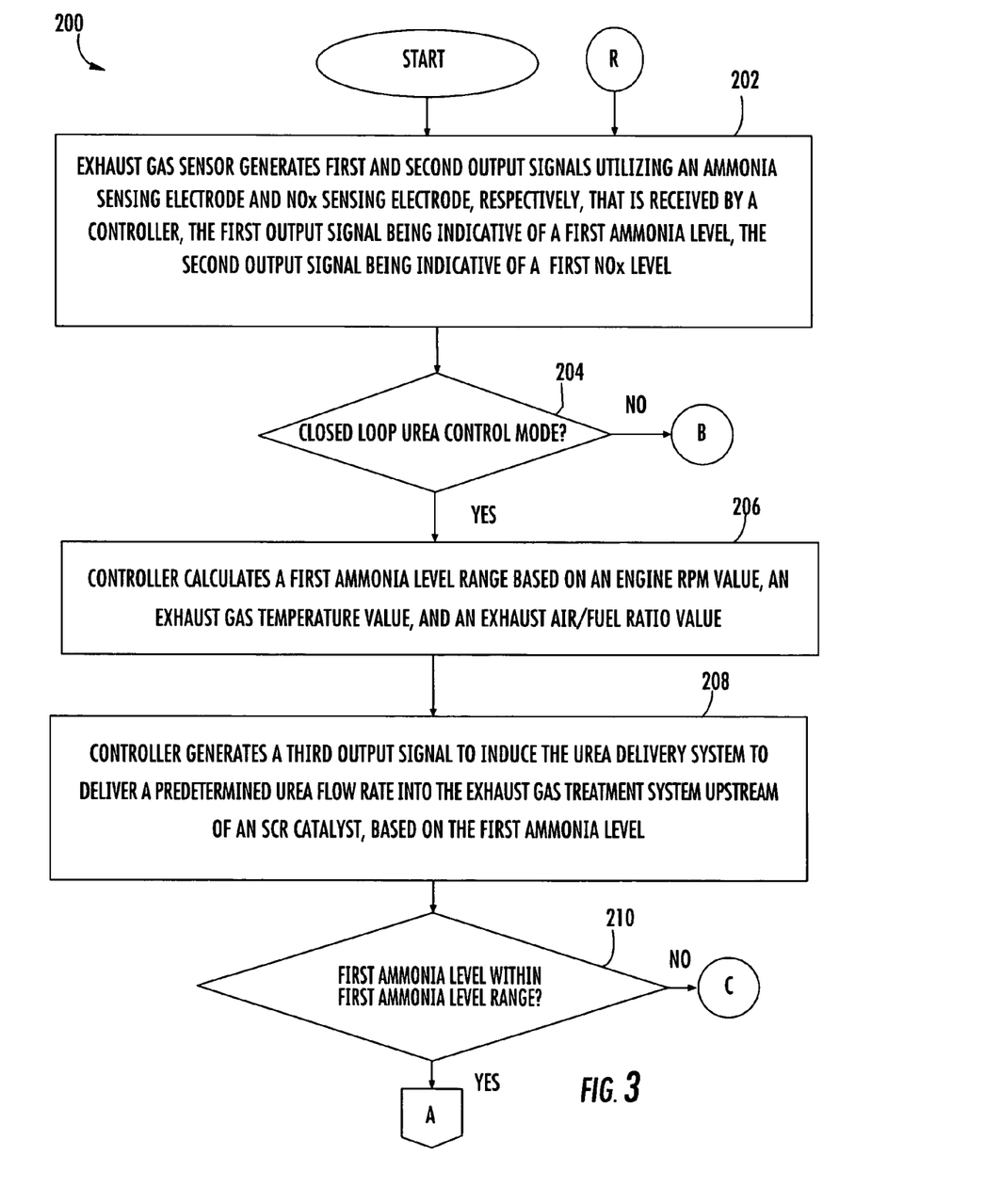
FIGS. 3-8 are flow charts of a method for monitoring the exhaust gas treatment system of FIG. 1.
Figure 4:
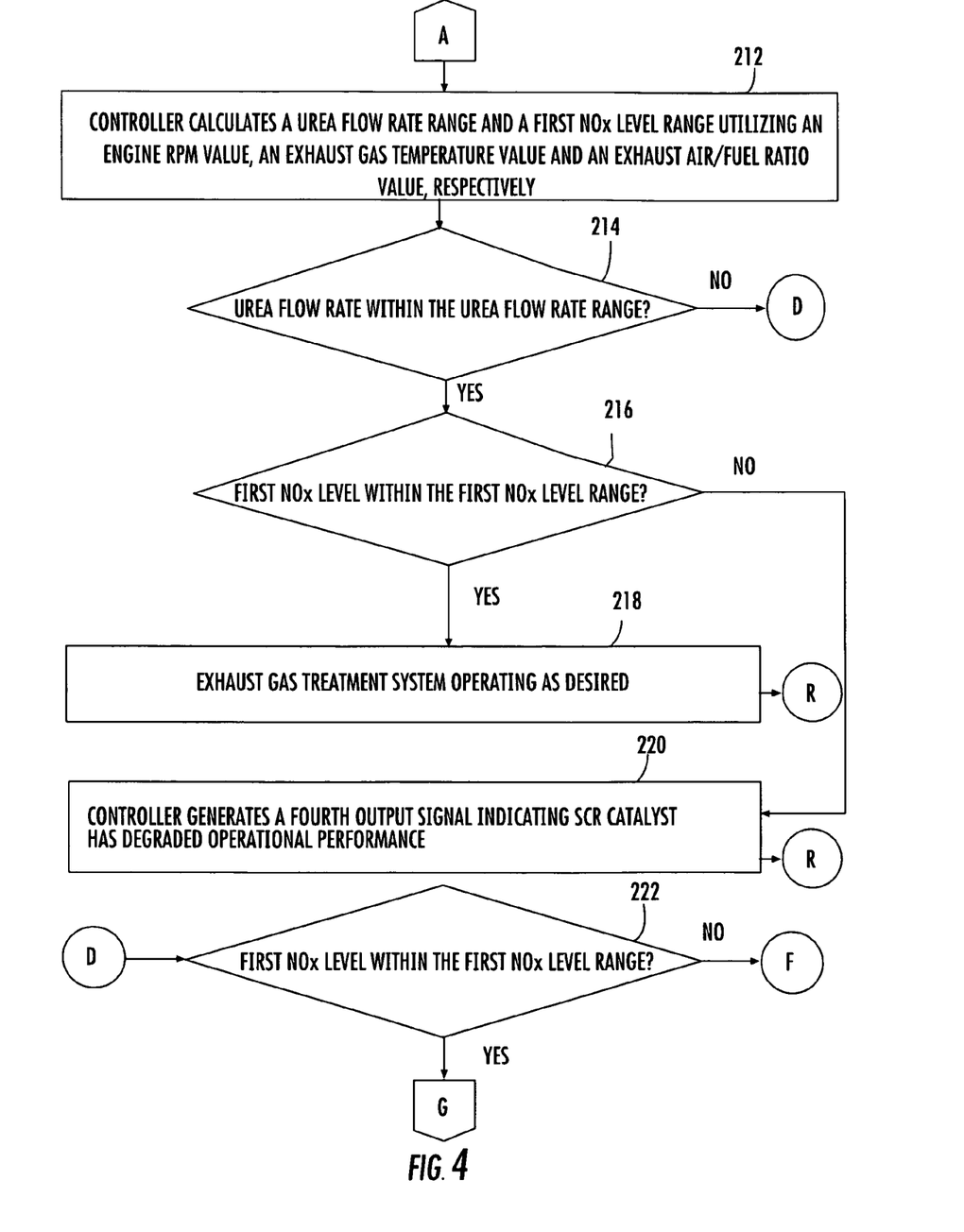
Figure 5:
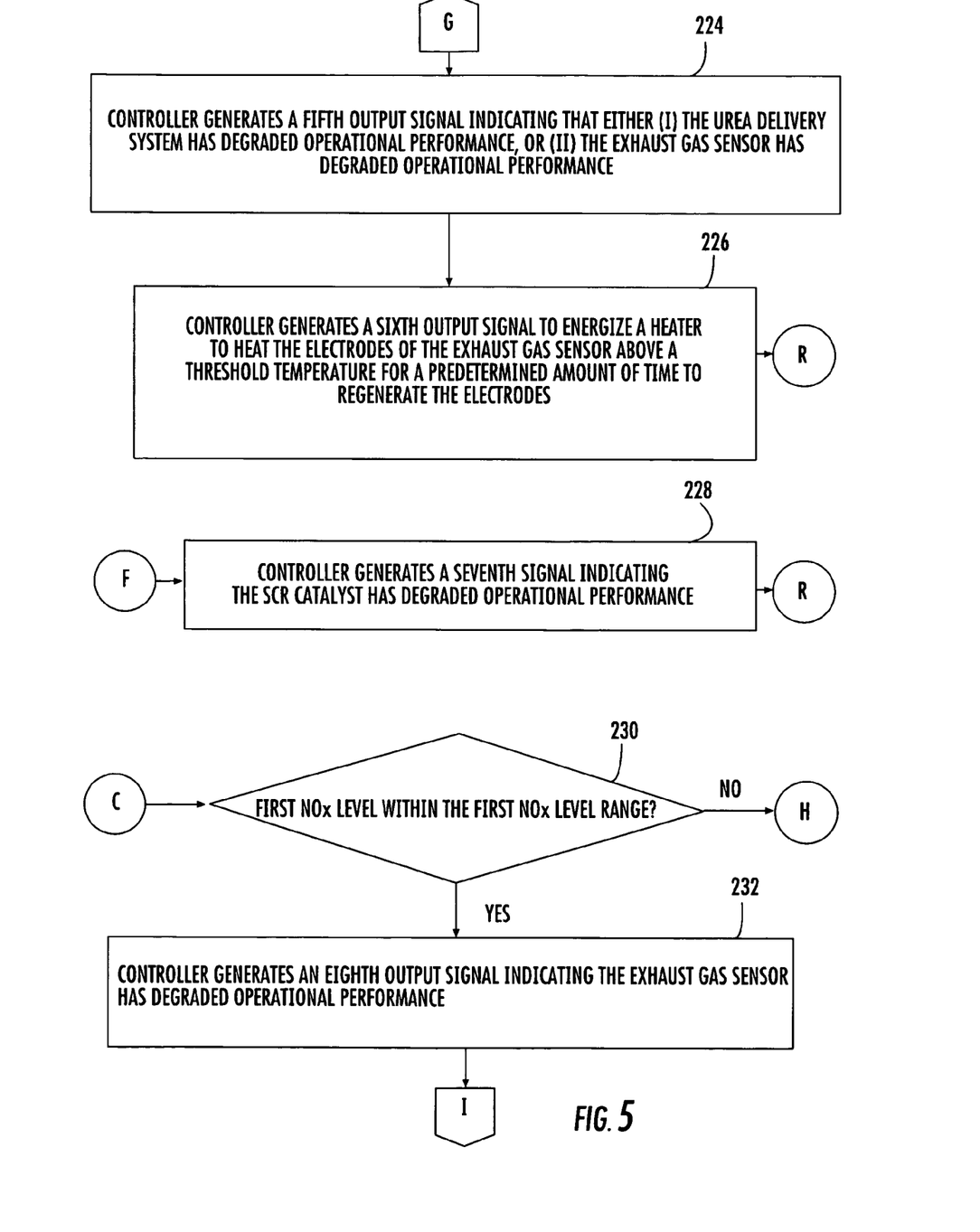
Figure 6:
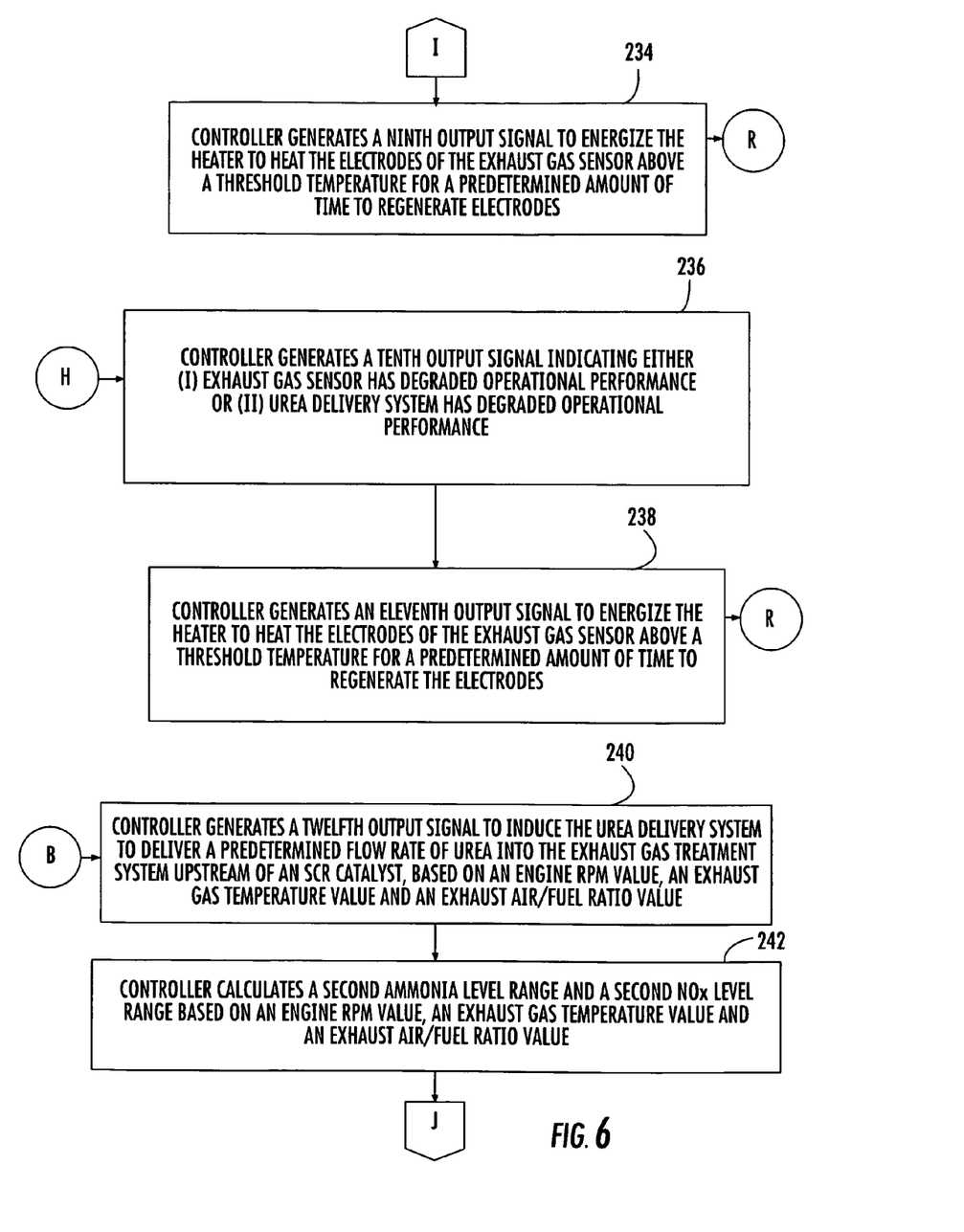
Figure 7:
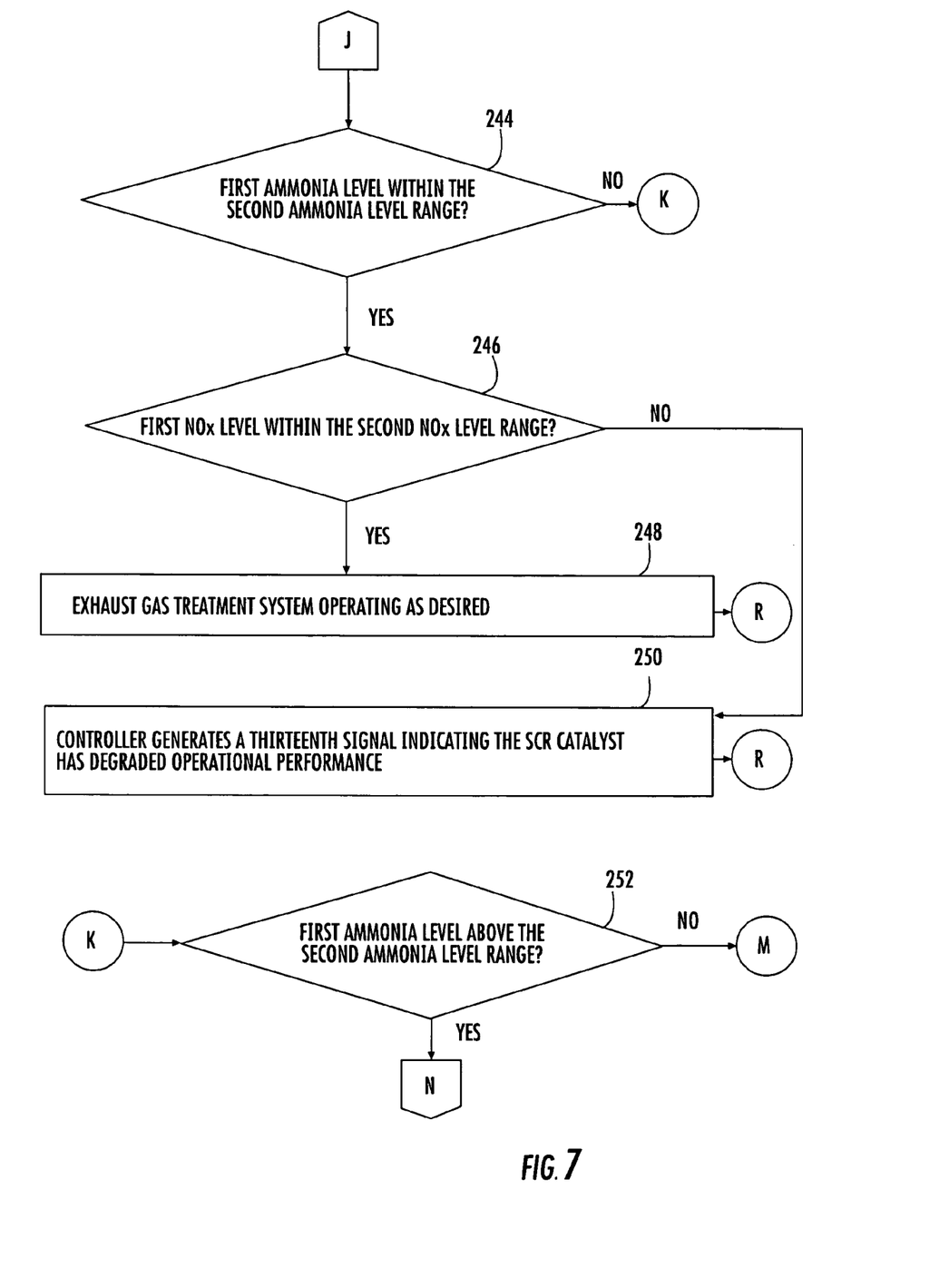
Figure 8:
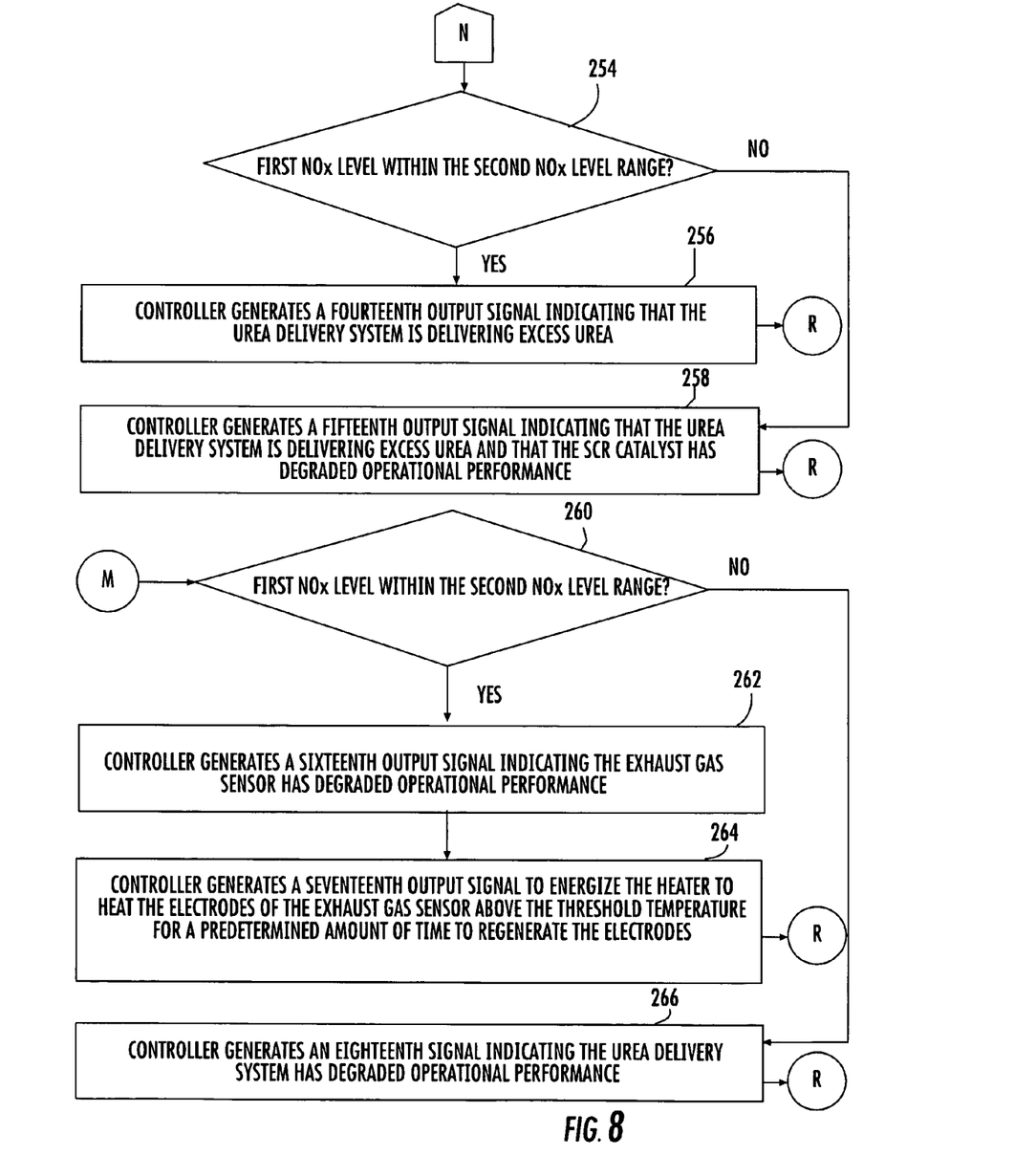

Referring to FIG. 2, the exhaust gas sensor 30 is provided to detect ammonia levels and NOx levels in the exhaust gases. The exhaust gas sensor 30 generates a signal (A) indicative of ammonia level in the exhaust gases, a signal (NOx1) indicative of NOx level in the exhaust gases, and a signal (I) indicative of exhaust gas sensor 30 temperature. The exhaust gas sensor 30 includes an $NH_3$ sensing cell; comprising a $NH_3$ sensing electrode 102, a reference electrode 104, and an electrolyte 106 (102/106/104); a $NO_x$ sensing cell, comprising a $NO_x$ sensing electrode 108, the reference electrode 104 and the electrolyte 106 (108/106/104); and an $NH_3$—$NO_x$ sensing cell; comprising the $NH_3$ and $NO_x$ sensing electrodes 102, 108 and the electrolyte 106 (102/106/108). The exhaust gas sensor 30 further includes insulating layers 160, 162, 164, 166, 168, and 170, a heater 112, electrical leads 130, 132, 134, 136, 138, 140, and 142, contact pads 144, 146, 148, 150, 152, and 154, and a temperature sensor comprising temperature sensing electrodes 114 and 116 disposed on opposite sides of a temperature sensing electrolyte 118 (114/118/116). The $NH_3$ sensing cell 102/106/104, the $NO_x$ sensing cell 108/106/104, the $NO_x$—$NH_3$ sensing cell 102/106/108, the heater 112, and the temperature sensor 114/118/116 are disposed at a sensing end 110 of the sensor 30. The contact pads 144, 146, 148, 150, 152, and 154 are disposed on a terminal end 122 of the sensor 30.

The $NH_3$ sensing cell 102/106/104 can produce an electromotive force based on the concentration of $NH_3$ and $NO_2$ in the exhaust gas (NO does not produce a detectable electromotive force in the $NH_3$ sensing cell 102/106/104). By using the Nernst Equation, the concentration of $NH_3$ and $NO_2$ combined can be determined at the $NH_3$ sensing cell 102/106/104 from the cell's electromotive force.

$$\text{emf} \approx \frac{kT}{ae}\text{Ln}(P_{NH_3}) - \frac{kT}{be}\text{Ln}(P_{O_2}) - \frac{kT}{ce}\text{Ln}(P_{H_2O}) - \frac{kT}{fe}\text{Ln}(P_{NO_2}) + \text{constant} \quad (3)$$

where: k=the Boltzmann constant
T=the absolute temperature of the gas
e=the electron charge unit
a, b, c, f, are constant
Ln=natural log
$P_{NH_3}$=the partial pressure of ammonia in the gas,
$P_{O_2}$=the partial pressure of oxygen in the gas,
$P_{NO_2}$=the partial pressure of nitrogen dioxide in the gas,
$P_{H_2O}$=the partial pressure of water vapor in the gas
$P_{NO}$=the partial pressure of nitrogen monoxide in the gas.

The temperature sensor 114/118/116 can measure a temperature indicative of the absolute gas temperature (T). The partial pressure of oxygen gas and of water can be calculated using sensors such as air/fuel ratio sensors, oxygen sensor, mass air flow sensor, and other engine or exhaust gas sensors. In most diesel exhaust conditions, the emf effects due to $O_2$ and $H_2O$ effect will cancel each other. For further explanation on the operation of the exhaust gas sensor 30, and for further explanation on exhaust gas sensor materials, see U.S. Provisional Patent Application No. 60/725,054, which is hereby incorporated by reference in its entirety.

In the $NH_3$ sensing cell 102/106/104, when the $NO_2$ concentrations are relatively low, the term $$\frac{kT}{fe}\text{Ln}(P_{NO_2})$$

can be eliminated from equation (1) and the partial pressure of $NH_3$ becomes the only unknown in equation (3). Therefore, the controller 32 can apply equation (3) (or a suitable approximation thereof) to determine the amount of $NH_3$ in the presence of $O_2$ and $H_2O$, or the controller 32 can access a lookup table from which the $NH_3$ partial pressure can be selected in accordance with the electromotive force output from the $NH_3$ sensing cell 102/106/104.

The primary reactants at electrodes of the $NO_x$ sensing cell 108/106/104 are NO, $H_2O$, $NO_2$, and $O_2$. The partial pressure of reactive components at the electrodes of the $NO_x$ sensing cell 108/106/104 can be determined from the cell's electromotive force by using the Nernst Equation, Equation 4:

$$\text{emf} \approx \frac{kT}{2e}\text{Ln}(P_{NO}) - \frac{kT}{4e}\text{Ln}(P_{O_2}) - \frac{kT}{2e}\text{Ln}(P_{H_2O}) - \frac{kT}{4e}\text{Ln}(P_{NO_2}) + \text{constant} \quad (4)$$

At low $NO_2$ partial pressures, the cell will produce a positive emf. At high $NO_2$ partial pressures, the cell will produce a negative emf (with reference electrode 104 set at positive polarity).

At high concentrations of $NO_2$, the $NO_2$ reacts at both the $NH_3$ sensing electrode 102 and the NOx sensing electrode 108. Therefore, the electrical potential at the $NH_3$ sensing electrode 102 due to $NO_2$ reactions is approximately equal to the electrical potential at the NOx sensing electrode 108 due to $NO_2$ reactions, resulting in zero overall change in electromotive force due to reactions involving $NO_2$. Therefore, in the $NH_3$—$NO_x$ sensing cell 102/106/108, when the $NO_2$ concentrations are relatively high, the amount $NH_3$ becomes the only unknown in equation (4), and, the controller 32 can use emf out put of cell 102/106/108 directly (or a suitable approximation thereof) to determine the amount of $NH_3$ in the presence of $O_2$ and $H_2O$, or the controller 32 can access a lookup table from which the $NH_3$ partial pressure can be selected in accordance with the electromotive force output from the $NH_3$—$NO_x$ sensing cell 102/106/108 and from the air/fuel ratio information provided by the engine ECM.

Since at lower $NO_2$ partial pressures, the $NH_3$ sensing cell 102/106/104 more accurately detects $NH_3$, but at higher $NO_2$ partial pressures, the $NH_3$—$NO_x$ sensing cell 102/106/108 more accurately detects $NH_3$, the controller 32 selects the appropriate cell according to the selection rule below:

1. Whenever the electromotive force between the NOx sensing electrode 108 and the reference electrode 104 (measured at positive polarity) is greater than a selected emf (e.g., 0 millivolts (mV),+10 mV, or−10 mV), the $NH_3$ electromotive force is equal to the electromotive force measured between the $NH_3$ sensing electrode 102 and the reference electrode 104.

2. Whenever the electromotive force between the NOx sensing electrode 108 and the reference electrode 104 is not greater than the selected emf (e.g., 0 millivolts (mV),+10 mV, or −10 mV), the $NH_3$ electromotive force is equal to the electromotive force between the NH₃ sensing electrode 102 and the NOx sensing electrode 108.

The heater 112 is provided to maintain the sensor 30 at a selected operating temperature. More specifically, the heater is provided to heat the sensing end 110 of the sensor 30 to a sufficient temperature to facilitate the various electrochemical reactions therein. Further, the heater 112 can heat the electrodes 102, 104, 108 to a predetermined temperature for regeneration. The heater 112 can heat the electrodes 102, 104, 108 to an operating temperature of about 300° C. to about 800° C. depending on the engine operating conditions and the materials used in the electrode 102, 104, 108. The heater 112 can regenerate the electrodes 102, 104, 108 by heating the electrodes 102, 104, 108 above a threshold temperature for a predetermined time. For example, the heater 112 can heat the electrodes to a temperature above about 700° C. for a time period of about 5 minutes to about 60 minutes and, more specifically, for a time period of about 15 minutes to about 45 minutes to burn off soot or other contaminants on the electrodes 102, 104, 108.

The heater 112 can be positioned as part of the monolithic design of the sensor 30, for example between insulating layers 168 and 170, in thermal communication with the temperature sensor 114/118/116 and the sensing cells 102/106/104, 102/106/108, and 108/106/104. In other embodiments, the heater 112 can be in thermal communication with the cells without necessarily being part of a monolithic laminate structure, e.g., simply by being in close physical proximity to a cell.

The heater 112 can be a resistance heater and can include a line pattern (connected parallel lines, serpentine, and/or the like). The heater 112 can include, for example, platinum, aluminum, palladium, and the like, as well as mixtures comprising at least one of the foregoing, oxides comprising at least one of the foregoing, and alloys comprising at least one of the foregoing metals. The electrical leads 152 and 154 are provided to transfer electric current from an external power source to the heater 112.

The temperature sensor (114/118/116) is provided to measure the temperature of the sensing end 110 of the exhaust gas sensor 30. The temperature sensing electrodes 114, 116 include electrically conductive materials such as metals including platinum (Pt), copper (Cu), silver (Ag), palladium (Pd), gold (Au), alloys comprising at least one of the foregoing, as well as combinations comprising at least one of the foregoing. The electrolyte 118 can include ionic conducting material including the same or similar materials to electrolyte 106 such as yttria-stabilized zirconia and the like. The temperature sensor 114/118/116 can conduct electric current through the electrodes 114, 116 providing ionic conductance through the electrolyte layer 118, which is a function of temperature. By measuring an electrical impedance (I) of a closed loop circuit that includes the temperature sensor 114/118/116, the controller 32 can calculate the temperature of sensing end 110 the exhaust gas sensor 30.

The contact pads 144, 146, 148, and 150 are provided to transfer signals from the exhaust gas sensor 30 to the controller 32. The contact pad 144 receives electric current from the ammonia sensing electrode 102 via the electrical lead 130. The contact pad 146 receives electric current from the NOx sensing electrode 108 via the electrical lead 132. The contact pad 148 receives electric current from the reference electrode 104 via the electrical lead 134 and receives electric current from the temperature sensing electrode 114 via the electrical lead 136. The contact pad 150 receives electric current from the temperature sensing electrode 116 via the electrical lead 138.

The contact pads 144, 146, 148, 150, 152, and 154 and the electrical leads 130, 132, 134, 136, 138, 140, and 142 can include electrically conductive materials such as metals including platinum (Pt), copper (Cu), silver (Ag), palladium (Pd), gold (Au), alloys comprising at least one of the foregoing, as well as combinations comprising at least one of the foregoing.

Referring again to FIG. 1, the RPM sensor 36 is provided to measure an engine speed of the engine 12. The RPM sensor 36 generates an (RPM) signal indicative of the number of revolutions per minute of the engine 12, that is received by the controller 32. The RPM sensor 36 can comprise a crankshaft sensor or a camshaft sensor, for example.

The mass air flow sensor 34 is provided to generate a (MAF) signal indicative of a mass air flow inducted into the engine 12, that is received by the controller 32. The controller 32 can use the mass air flow level to calculate the air/fuel ratio of the exhaust gases.

The temperature sensor 38 is provided to measure a temperature of exhaust gases exiting the engine 12. The temperature sensor 38 generates a (T) signal indicative of temperature that is received by the controller 32.

The controller 32 is provided to receive the (NOx1), and (A) signals from the exhaust gas sensor 30, the (MAF) signal from the mass air flow sensor 34 (MAF), the (RPM) signal from the RPM sensor 36, and the (T) signal from the temperature sensor 38 to actively monitor the exhaust treatment system 14. The controller 32 is a computer including a microprocessor, input/output ports, read only memory in the form of an electronic storage medium for executable programs or algorithms and calibration values or constants, random access memory, as well as data buses for allowing the necessary communications within controller 32. From the output signals, the controller 32 can determine various conditions of the engine 12 including the air/fuel ratio, engine speed in revolutions per minute (RPM), engine load, and engine temperature. The controller can calculate air/fuel ratio in the exhaust by measuring an engine air intake level using the mass air flow sensor 34, and by using the air intake level, fuel intake level, and other engine conditions (for example, engine temperature and engine speed), to determine the amount of air and fuel reacted in the engine 12. The controller 32 can use the output signals along with algorithms, look up tables, and constants resident upon the microcomputer of the controller 32 to monitor the exhaust treatment system 14 as described below.

Referring to FIGS. 1 and 2, the controller 32 measures a voltage between the contact pad 146 and the contact pad 148 corresponding to the (NOx1) signal. The controller 32 measures a voltage either between the contact pad 144 and the contact pad 148 or between the contact pad 144 and the contact pad 146 corresponding to the (A) signal indicative of an ammonia concentration, depending on the selection rule (as discussed above). The controller 32 measures an electrical impedance between the contact pad 148 and the contact pad 150 to determine the electrical impedance (I).

Referring to FIGS. 3-8, a method 200 for monitoring operation of the exhaust gas treatment system 14 using the exhaust gas sensor 30, the controller 32, will now be described.

At step 202, the exhaust gas sensor 30 generates first and second output signals utilizing an ammonia sensing electrode 102 and a NOx sensing electrode 108, respectively, that are received by a controller 32, the first output signal being indicative of a first ammonia level, the second output signal being indicative of a first NOx level.

At step 204, the controller 32 makes a determination as to whether to operate the urea delivery system 22 in closed loop mode based on predetermined engine operating parameters. For example, the controller 32 can operate the system 22 in closed loop urea control mode when a steady-state engine operating condition is detected and can operate the system 22 in open loop control mode when a transient engine operating condition is detected. If the value of step 204 equals "yes" the method advances to step 206. Otherwise, the method advances to step 240.

At step 206, the controller 32 calculates a first ammonia level range based on an engine RPM value, an exhaust gas temperature value, and an exhaust air/fuel ratio value. It should be noted the exhaust air/fuel ratio value can be estimated based on the (MAF) signal and an amount of fuel being combusted in the engine 12.

At step 208, the controller 32 generates a third output signal to induce the urea delivery system 20 to deliver a predetermined urea flow rate into the exhaust gas treatment system 14 upstream of an SCR catalyst 22, based on the first ammonia level.

At step 210, the controller 32 makes a determination as to whether the first ammonia level is within the first ammonia level range. If the value of step 210 equals "yes," the method advances to step 212. Otherwise, the method advances to step 230.

At step 212, the controller 32 calculates a urea flow rate range and a first NOx level range utilizing an engine RPM value, an exhaust gas temperature value and an exhaust air/fuel ratio value, respectively.

At step 214, the controller 32 makes a determination as to whether the urea flow rate of is within the urea flow rate range. If the value of step 214 equals "yes", the method advances to step 216. Otherwise, the method advances to step 222.

At step 216, the controller 32 makes a determination as to whether the first NOx level received by the controller 32 is within the first NOx level range. If the value of step 216 equals "yes", the method advances to step 218. Otherwise, the method advances to step 220.

At step 218, the exhaust gas treatment system 14 is operating as desired. After step 218, the method returns to step 202.

At step 220, the controller 32 generates a fourth output signal indicating the SCR catalyst 22 has degraded operational performance. After step 220, the method returns to step 202.

Referring again to step 214, when the value of step 214 equals "no", the method advances to step 222. At step 222, the controller 32 makes a determination as to whether the first NOx level is within the first NOx level range. If the value of step 222 equals "yes", the method advances to step 224. Otherwise, the method advances to step 228.

At step 224, the controller 32 generates a fifth output signal indicating that either (i) the urea delivery system 20 has degraded operational performance, or (ii) the exhaust gas sensor 30 has degraded operational performance.

At step 226 the controller 32 generates a sixth output signal to energize the heater 112 to heat the electrodes 102, 104, 108 of the exhaust gas sensor 30 above a threshold temperature for a predetermined amount of time to regenerate the electrodes 102, 104, 108.

At step 228, the controller 32 generates a seventh signal indicating the SCR catalyst 22 has degraded operational performance. After step 228, the method returns to step 202.

Referring again to step 210, when the value of step 210 equals "no", the method advances to step 230. At step 230, the controller 32 makes a determination as to whether the first NOx level is within the first NOx level range. If the value of step 230 equals "yes", the method advances to step 232. Otherwise the method advances to step 236.

At step 232, the controller 32 generates an eighth output signal indicating the exhaust gas sensor 30 has degraded operational performance.

At step 234, the controller 32 generates a ninth output signal to energize the heater 112 to heat the electrodes 102, 104, 108 of the exhaust gas sensor 30 above a threshold temperature for a predetermined amount of time to regenerate the electrodes 102, 104, 108.

Referring again to step 230, when the value of step 230 equals "no", the method advances to step 236. At step 236, the controller 32 generates a tenth output signal indicating that either (i) the exhaust gas sensor 30 has degraded operational performance or (ii) the urea delivery system 20 has degraded operational performance.

At step 238, the controller 32 generates an eleventh output signal to energize the heater 112 to heat the electrodes 102, 104, 108 of the exhaust gas sensor 30 above a threshold temperature for a predetermined amount of time to regenerate the electrodes 102, 104, 108. After step 238, the method returns to step 202.

Referring again to step 204, when the value of step 204 equals "no", the method advances to step 240. At step 240, the controller 32 generates a twelfth output signal to induce the urea delivery system 20 to deliver a predetermined urea flow rate into the exhaust gas treatment system 14 upstream of the SCR catalyst 22, based on an engine RPM value, an exhaust gas temperature value, and an exhaust air/fuel ratio.

At step 242, the controller 32 calculates a second ammonia range and a second NOx level range based on an engine RPM value, an exhaust gas temperature value and an exhaust air/fuel ratio value.

At step 244, the controller 32 makes a determination as to whether the first ammonia level is within the second ammonia level range. If the value at step 244 equals "yes", the method advances to step 246. Otherwise, the method advances to step 252.

At step 246, the controller 32 makes a determination as to whether the first NOx level is within the second NOx level range. If the value of step 246 equals "yes", the method advances to step 248. Otherwise, the method advances to step 250.

At step 248, the exhaust gas treatment system 14 is operating as desired.

At step 250, the controller 32 generates a thirteenth signal indicating the SCR catalyst 22 has degraded operational performance. After step 250, the method returns to step 202.

Referring again to step 244, when the value of step 244 equals "no", the method advances to step 252. At step 252, the controller 32 makes a determination as to whether the first ammonia level is above the second ammonia level range. If the value at step 252 equals "yes", the method advances to step 254. Otherwise, the method advances to step 260.

At step 254, the controller 32 makes a determination as to whether the first NOx level is within the second NOx level range. If the value of step 254 equals "yes", the method advances to step 256. Otherwise, the method advances to step 258.

At step 256, the controller 32 generates a fourteenth signal indicating that the urea delivery system 20 is delivering excess urea. After step 256, the method returns to step 202.

At step 258, the controller 32 generates a fifteenth signal indicating that the urea delivery system 20 is delivering excess urea and that the SCR catalyst 22 has degraded operational performance. After step 258, the method returns to step 202.

At step 260, the controller 32 makes a determination as to whether the first NOx level is within the second NOx level range. If the value of step 260 equals "yes", the method advances to step 262. Otherwise, the method advances to step 264.

At step 262, the controller 32 generates a sixteenth output signal indicating the exhaust gas sensor 30 has degraded operational performance.

At step 264, the controller 32 generates a seventeenth output signal to energize the heater 112 to heat the electrodes 102, 104, 108 of the exhaust gas sensor 30 above the threshold temperature for a predetermined amount of time to regenerate the electrode 102, 104, 108. After step 264, the method returns to step 202.

Referring again to step 260, when the value of step 260 equals "no", the method advances to step 266. At step 266, the controller 32 generates an eighteenth signal indicating the urea delivery system 20 has degraded operational performance. After step 266, the method to step 202. After step 266, the method advances to step 202.

Figure 9:
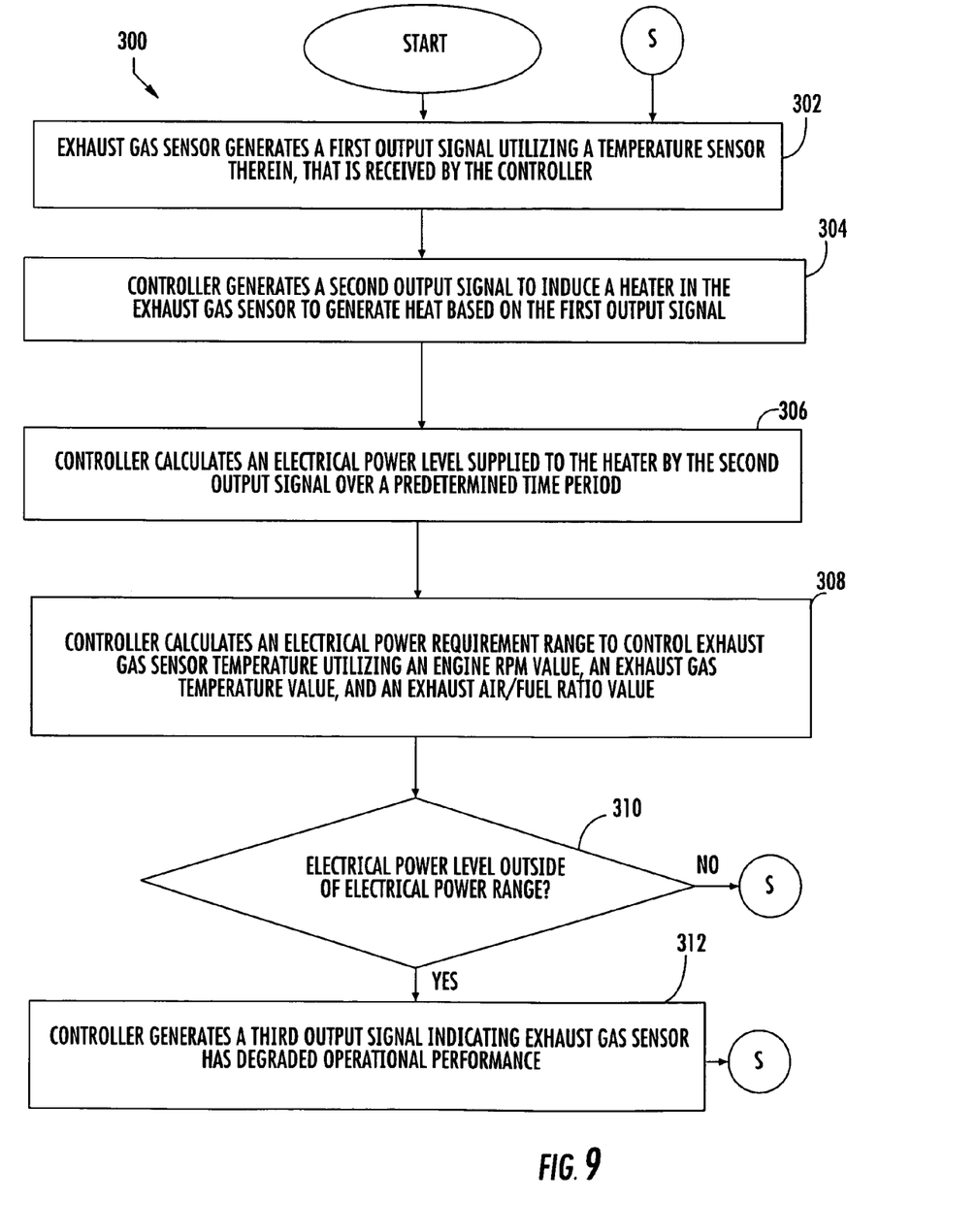
FIG. 9 is a flow chart of a method for monitoring operation of the exhaust gas sensor of FIG. 2.

Referring to FIG. 9, a method 300 for monitoring operation of the exhaust gas sensor 30 using the temperature sensor 114/118/116 and the controller 32 will now be described.

At step 302, the exhaust gas sensor 30 generates a first output signal utilizing the temperature sensor 1 14/118/116 therein, that is received by the controller 32.

At step 304, the controller 32 generates a second output signal to induce the heater 112 in the exhaust gas sensor 30 to generate heat based on the first output signal.

At step 306, the controller 32 calculates an electrical power level supplied to the heater 112 by the second output signal over a predetermined time period.

At step 308, the controller 32 calculates an electrical power level requirement range to control exhaust gas sensor temperature utilizing an engine RPM value, an exhaust gas temperature value, and an exhaust air/fuel ratio value.

At step 310, the controller 32 makes a determination as to whether the electrical power level is outside the electrical power level range. If the value of step 310 equals "yes" the method advances to step 312. Otherwise, the exhaust gas sensor 30 is operating as desired and the method returns to step 302.

At step 312, the controller 32 generates a third output signal indicating exhaust gas sensor 30 has degraded operational performance. After step 312, the method returns to step 302.

The system and method for monitoring the exhaust gas treatment system provide substantial advantage over existing systems and methods. In particular, the system and method can detect degraded operational performance of an SCR catalyst and exhaust gas sensor utilized in the exhaust gas treatment system.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. Unless defined otherwise, technical and scientific terms used herein have the same meaning as is commonly understood by one of skill in the art to which this invention belongs. The modifier "about" used in connection with a quantity is inclusive of the stated value and has the meaning dictated by the context (e.g., includes the degree of error associated with measurement of the particular quantity). In describing the arrangement of exhaust treatment devices within a system, the terms "upstream" and "downstream" are used. These terms have their ordinary meaning. For example, an "upstream" device as used herein refers to a device producing a fluid or gas output stream that is fed to a "downstream" device.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for monitoring operation of an exhaust gas treatment system using an exhaust gas sensor, the exhaust gas treatment system having an exhaust pipe configured to receive exhaust gases, an SCR catalyst coupled to the exhaust pipe, and a urea delivery system configured to deliver urea upstream the SCR catalyst, the exhaust gas sensor having an ammonia sensing electrode communicating with exhaust gases downstream of the SCR catalyst, the method comprising:

generating a first output signal utilizing the ammonia sensing electrode, the first output signal being indicative of a first ammonia level;

generating a second output signal to induce the urea delivery system to deliver a predetermined flow rate of urea upstream of the SCR catalyst, the second output signal being based on the first output signal;

calculating a first ammonia level range based on an engine RPM value an exhaust as temperature value and an exhaust air/fuel ratio value; and generating a third output signal when the first ammonia level is outside the first ammonia level range, the third output signal indicating at least one of the urea delivery system having degraded operational performance, the SCR catalyst having degraded operational performance, and the exhaust gas sensor having degraded operational performance.

2. The method of claim 1, further comprising generating a fourth output signal to energize a heater to heat the ammonia sensing electrode to a temperature greater than a threshold temperature for a predetermined amount of time to regenerate the ammonia sensing electrode when the first ammonia level is outside the first ammonia level range.

3. The method of claim 1, further comprising:

generating a fourth output signal utilizing a NOx sensing electrode in the exhaust gas sensor, the fourth output signal indicative of a first NOx level;

calculating a first NOx level range based on at least one of an engine RPM value, an exhaust gas temperature value, and an exhaust air/fuel ratio value; and generating a fifth output signal when the first NOx level is outside the first NOx level range, the fifth output signal indicating at least one of the urea delivery system having degraded operational performance, the SCR catalyst having degraded operational performance, and the exhaust gas sensor having degraded operational performance.

4. The method of claim 3, further comprising generating a sixth output signal to energize a heater to heat the NOx sensing electrode to a temperature greater than a threshold temperature for a predetermined amount of time to regenerate the NOx sensing electrode when the first NOx level is outside the first NOx level range.

5. The method of claim 3, wherein the first NOx level range is calculated based on an engine RPM value, an exhaust gas temperature value, and an exhaust air/fuel ratio value.

6. The method of claim 3, wherein the first output signal is a measured voltage between the ammonia sensing electrode and a reference electrode in the exhaust gas sensor when the fourth output signal is greater than or equal to a threshold value, and the first output signal is a measured voltage between the ammonia sensing electrode and the NOx sensing electrode when the fourth output signal is less than the threshold value.

7. A method for monitoring operation of an exhaust gas treatment system using an exhaust gas sensor, the exhaust gas treatment system having an exhaust pipe configured to receive exhaust gases, an SCR catalyst coupled to the exhaust pipe, and a urea delivery system configured to delivery urea upstream of the SCR catalyst, the exhaust gas sensor having an ammonia sensing electrode communicating with exhaust gases downstream of the SCR catalyst, the method comprising:
    generating a first output signal utilizing the ammonia sensing electrode, the first output signal being indicative of a first ammonia level;
    generating a second output signal utilizing at least a first engine operating parameter to induce the urea delivery system to deliver a predetermined flow rate of urea upstream of the SCR catalyst;
    calculating a first ammonia level range based on an engine RPM value, an exhaust gas temperature value, and an exhaust air/fuel ratio value; and
    generating a third output signal when the first ammonia level is outside the first ammonia level range, the third output signal indicating at least one of the urea delivery system having degraded operational performance, the SCR catalyst having degraded operational performance, and the exhaust gas sensor having degraded operational performance.

8. The method of claim 7, further comprising generating a fourth output signal to energize a heater to heat the ammonia sensing electrode to a temperature greater than a threshold temperature for a predetermined amount of time to regenerate the ammonia sensing electrode when the first ammonia level is outside the first ammonia level range.

9. The method of claim 7, further comprising:
    generating a fourth output signal utilizing a NOx sensing electrode in the exhaust gas sensor, the fourth output signal being indicative of a first NOx level;
    calculating a first NOx level range based on at least one of an engine RPM value, an exhaust gas temperature value, and an exhaust air/fuel ratio value; and
    generating a fifth output signal when the first NOx level is outside the first NOx level range, the fifth output signal indicating at least one of the urea delivery system having degraded operational performance, the SCR catalyst having degraded operational performance, and the exhaust gas sensor having degraded operational performance.

10. The method of claim 9, further comprising generating a sixth output signal to energize a heater to heat the NOx sensing electrode to a temperature greater than a threshold temperature for a predetermined amount of time to regenerate the NOx sensing electrode when the first NOx level is outside the first NOx level range.

11. The method of claim 9, wherein the first NOx level range is calculated based on an engine RPM value, an exhaust gas temperature value, and an exhaust air/fuel ratio value.

12. The method of claim 9, wherein the first output signal is a measured voltage between the ammonia sensing electrode and a reference electrode in the exhaust gas sensor when the fourth output signal is greater than or equal to a threshold value, and the first output signal is a measured voltage between the ammonia sensing electrode and the NOx sensing electrode when the fourth output signal is less than the threshold value.

13. A system for monitoring operation of an exhaust gas treatment system, the exhaust gas treatment system having an exhaust pipe configured to receive exhaust gases, an SCR catalyst coupled to the exhaust pipe, and a urea delivery system configured to deliver urea upstream of the SCR catalyst, comprising:
    an exhaust gas sensor configured to generate a first output signal, the first output signal being indicative of a first ammonia level downstream of the SCR catalyst; and
    a controller operably communicating with the exhaust gas sensor, the controller configured to receive the first output signal, the controller further configured to generate a second output signal to induce the urea delivery system to deliver a predetermined flow rate of urea upstream of the SCR catalyst, the second output signal being based on the first output signal, the controller further configured to calculate a first ammonia level range utilizing a set of engine operating parameters comprising each of an engine RPM value, an exhaust gas temperature value, and an exhaust air/fuel ratio value, the controller further configured to generate a third output signal when the first ammonia level is outside the first ammonia level range, the third output signal indicating at least one of the urea delivery system having degraded operational performance, the SCR catalyst having degraded operational performance, and the exhaust gas sensor having degraded operational performance.

14. The system of claim 13, wherein the controller is further configured to generate a fourth output signal to energize a heater to heat the ammonia sensing electrode to a temperature greater than a threshold temperature for a predetermined amount of time to regenerate the ammonia sensing electrode when the first ammonia level is outside the first ammonia level range.

15. A system for monitoring operation of an exhaust gas treatment system, the exhaust gas treatment system having an exhaust pipe receiving exhaust gases, an SCR catalyst coupled to the exhaust pipe, and a urea delivery system configured to deliver urea upstream of the SCR catalyst, comprising:
    an exhaust gas sensor configured to generate a first output signal, the first output signal being indicative of a first ammonia level downstream the SCR catalyst; and
    a controller operably communicating with the exhaust gas sensor, the controller configured to receive the first output signal, the controller further configured to generate a second output signal utilizing at least one first engine operating parameter to induce the urea delivery system to deliver a predetermined flow rate of urea upstream of the SCR catalyst, the controller further configured to calculate a first ammonia level range utilizing a set of engine operating parameters comprising each of an engine RPM value, an exhaust gas temperature value, and an exhaust air/fuel ratio value, the controller further configured to generate a third output signal when the first ammonia level is outside the first ammonia level range, the third output signal indicating at least one of the urea delivery system having degraded operational performance, the SCR catalyst having degraded operational performance, and the exhaust gas sensor having degraded operational performance.

16. The system of claim 15, wherein the controller is further configured to generate a fourth output signal to energize a heater to heat the ammonia sensing electrode to a temperature greater than a threshold temperature for a predetermined amount of time to regenerate the ammonia sensing electrode when the first ammonia level is outside the first ammonia level range.

* * * * *